US011275749B2

(12) United States Patent
Roitman et al.

(10) Patent No.: US 11,275,749 B2
(45) Date of Patent: Mar. 15, 2022

(54) ENHANCED QUERY PERFORMANCE PREDICTION FOR INFORMATION RETRIEVAL SYSTEMS

(71) Applicant: International Business Machines Corporation, Armonk, NY (US)

(72) Inventors: Haggai Roitman, Haifa (IL); Shai Erera, Gilon (IL); Bar Weiner, D.N Hof ashqelon (IL)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 16/236,693

(22) Filed: Dec. 31, 2018

(65) Prior Publication Data

US 2020/0210438 A1     Jul. 2, 2020

(51) Int. Cl.
| | |
|---|---|
| G06F 16/00 | (2019.01) |
| G06F 16/2457 | (2019.01) |
| G06N 5/02 | (2006.01) |
| G06F 16/248 | (2019.01) |

(52) U.S. Cl.
CPC ...... *G06F 16/24578* (2019.01); *G06F 16/248* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,689,615 | B2 * | 3/2010 | Burges | G06F 16/9535 707/723 |
| 8,156,097 | B2 * | 4/2012 | Cao | G06F 16/3344 707/706 |
| 8,489,589 | B2 * | 7/2013 | Mei | G06F 16/24578 707/728 |
| 8,661,030 | B2 * | 2/2014 | El-Saban | G06F 16/951 707/723 |

(Continued)

OTHER PUBLICATIONS

Guanqun Cao et al., "Deep Multi-view Learning to Rank," Cornell University Library. arXiv:1801.10402v1 [cs.LG] Jan. 31, 2018.

(Continued)

*Primary Examiner* — Debbie M Le
(74) *Attorney, Agent, or Firm* — Patterson + Sheridan, LLP (57) ABSTRACT

Techniques are disclosed for query performance prediction (QPP) in the fusion-based retrieval setting. Symmetric list similarity measures used in traditional QPP techniques do not properly account for relevance-dependent aspects of the relationship between a given (base) reference list generated using an information retrieval technique and a final fused list generated using a fusion technique, as such a relationship is actually asymmetric. Embodiments more properly model the asymmetric relationship of reference and fused lists using an asymmetric co-relevance model that estimates, assuming a reference list contains relevant information, the odds that the fused list will be observed. In particular, the asymmetric co-relevance between a reference list and a fused list may be determined by adjusting a symmetric co-relevance of the (Continued)

reference list and the fused list using an odds ratio between the symmetric co-relevance of the reference list and the fused list to the reference list's own relevance.

20 Claims, 6 Drawing Sheets

(56) References Cited

U.S. PATENT DOCUMENTS

| | | | | |
|---|---|---|---|---|
| 8,868,579 | B2* | 10/2014 | Arora | G06F 16/9535 |
| | | | | 707/757 |
| 9,495,460 | B2* | 11/2016 | Taylor | G06F 16/9535 |
| 10,108,722 | B2* | 10/2018 | Erera | G06F 16/335 |
| 10,997,184 | B2* | 5/2021 | Paquet | G06F 16/248 |
| 2017/0220945 | A1* | 8/2017 | Barger | G06N 7/005 |
| 2018/0081628 | A1 | 3/2018 | Bajekal et al. | |

OTHER PUBLICATIONS

Shangsong Liang et al., "Manifold Learning for Rank Aggregation," International World Wide Web Conference Committee Apr. 23-27, 2018, 10 Pages.
Krikon et al., "Predicting the Performance of Passage Retrieval for Question Answering," CIKM'12, Oct. 29-Nov. 2, 2012, Maui, HI, USA. Copyright 2012 ACM 978-1-4503-1156-4/12/10.
Webber et al., "A Similarity Measure for Indefinite Rankings," ACM Transactions on Information Systems—Author's Version, vol. 28, No. 4, Nov. 2010, pp. 1-34.
Grace Period Disclosure: Roitman, Haggai. (2018). "Enhanced Performance Prediction of Fusion-based Retrieval." 195-198. 10.1145/3234944.3234950.
Chris Buckley. Topic prediction based on comparative retrieval rankings. In Proceedings of SIGIR '04.(Abstract Only).
David Carmel and Oren Kurland. Query performance prediction for IR. In Proceedings of SIGIR '12. 16 pages.
Gordon V. Cormack, Charles L A Clarke, and Stefan Buettcher. Reciprocal rank fusion outperforms condorcet and individual rank learning methods. In Proceedings of SIGIR '09.
Steve Cronen-Townsend, Yun Zhou, and W. Bruce Croft. Predicting query performance. In Proceedings of SIGIR '02. (Abstract Only).
Fernando Diaz. Performance prediction using spatial autocorrelation. In Proceedings of SIGIR '07.
Oren Kurland, Anna Shtok, Shay Hummel, Fiana Raiber, David Carmel, and Ofri Rom. Back to the roots: A probabilistic framework for query-performance prediction. In Proceedings of CIKM '12.
Victor Lavrenko and W. Bruce Croft. Relevance based language models. In Proceedings of SIGIR '01.
GadMarkovits, Anna Shtok, Oren Kurland, and David Carmel. Predicting query performance for fusion-based retrieval. Proceedings of CIKM'12, pp. 813-822.
Fiana Raiber, Oren Kurland, Filip Radlinski, andMilad Shokouhi. Learning asymmetric co-relevance. In Proceedings of ICTIR '15.
Haggai Roitman. An enhanced approach to query performance prediction using reference lists. In Proceedings of SIGIR '17. (Abstract Only).
Haggai Roitman, Shai Erera, and BarWeiner. Robust standard deviation estimation for query performance prediction. In Proceedings of ICTIR '17. (Abstract Only).
Anna Shtok, Oren Kurland, and David Carmel. Query performance prediction using reference lists. ACM Trans. Inf. Syst., 34(4):19:1-19:34, Jun. 2016. (Abstract Only).
L. Tan and C. L. A. Clarke. A family of rank similarity measures based on maximized effectiveness difference. IEEE Transactions on Knowledge and Data Engineering, 27(11):2865-2877, Nov. 2015.
Shengli Wu. Data Fusion in Information Retrieval. Springer Publishing Company, Incorporated, 2012. (Abstract Only).
Shengli Wu and Sally McClean. Performance prediction of data fusion for information retrieval. Inf. Process. Manage., 42(4):899-915, Jul. 2006.
H.P Young. An axiomatization of borda's rule. Journal of Economic Theory, 9(1):43-52, 1974. (Abstract Only).
Yun Zhou and W. Bruce Croft. Query performance prediction in web search environments. In Proceedings of SIGIR 07.

* cited by examiner

ENHANCED QUERY PERFORMANCE PREDICTION FOR INFORMATION RETRIEVAL SYSTEMS

STATEMENT REGARDING PRIOR DISCLOSURES BY THE INVENTOR OR A JOINT INVENTOR

The following disclosures are submitted under 35 U.S.C. 102(b)(1)(A): Roitman, Haggai. (2018). "Enhanced Performance Prediction of Fusion-based Retrieval." 195-198. 10.1145/3234944.3234950.

BACKGROUND

Field of the Invention

The present invention relates to information retrieval, and more specifically, to query performance prediction for information retrieval systems.

Description of the Related Art

Information retrieval systems seek to provide relevant information from a collection of information resources for a user's information needs. For a given query and corpus of documents, an information retrieval technique may return a ranked list indicating the relevance of the documents to the query. Different information retrieval techniques may return different ranked lists for the same query. Fusion-based retrieval has been used to improve the quality of information retrieval results by combining the ranked list outputs of multiple retrieval techniques into a single fused list, which is returned as the final retrieval outcome.

Query performance prediction (QPP) techniques may be used to assess information retrieval performance in the absence of relevance judgments. In the fusion-based retrieval setting, one commonly employed QPP approach treats the various base ranked lists, generated by different retrieval techniques prior to the fusion of such lists, as reference lists and combines QPP estimates for the reference lists according to their symmetric similarity to the fused list. The higher the predicted query performance according to a given reference list is and the more similar that list is to the fused list, the better the query performance is assumed to be.

SUMMARY

According to one embodiment, a computer-implemented method is provided for predicting query performance. The method generally includes receiving one or more initial ranked lists that are generated using respective information retrieval techniques in response to a query and a final ranked list that is generated based, at least in part, on the one or more initial ranked lists. The method further includes determining a likelihood that the final ranked list includes information relevant to the query based, at least in part, on (i) a respective likelihood that each of the one or more initial ranked lists includes information relevant to the query, and (ii) a respective asymmetric co-relevance between each of the one or more initial ranked lists and the final ranked list.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments are disclosed that enhance query performance prediction (QPP) in information retrieval systems. The symmetric list similarity measures used by traditional QPP techniques in the fusion-based retrieval setting (and other settings) do not properly account (if at all) for relevance-dependent aspects of the relationship between a given (base) reference list generated using an information retrieval technique and a final fused list generated using a fusion technique. Such a relationship is actually asymmetric, rather than symmetric, as there is a "cause and effect" based relationship between the reference lists and the fused list generated from the reference lists. Embodiments more properly model the asymmetric relationship of reference and fused lists using an asymmetric co-relevance model that estimates, assuming a reference list includes relevant information, the odds that the fused list will be observed. In particular, the asymmetric co-relevance between a reference list and a fused list may be determined by adjusting a symmetric co-relevance of the reference list and the fused list using an odds ratio between the symmetric co-relevance of the reference list and the fused list to the reference list's own relevance. In the fusion-based retrieval setting, the QPP techniques disclosed herein that model asymmetric co-relevance relationships between reference lists and a fused list may be used to select a subset of reference lists to fuse from a set of reference lists and/or to select a fusion technique to use from multiple available fusion techniques.

Figure 1:
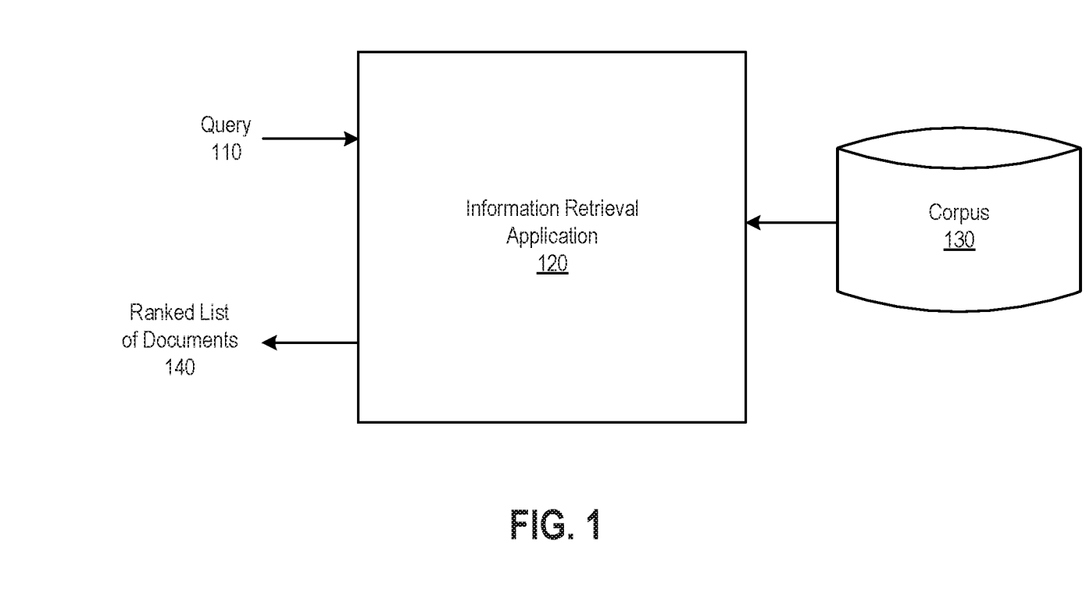
FIG. 1 illustrates an information retrieval system for processing queries, according to an embodiment.

FIG. 1 illustrates an information retrieval system for processing queries, according to an embodiment. As shown, an information retrieval application 120 is configured to receive a query 110, apply one or more information retrieval techniques to generate a ranked list 140 indicating the relevance of documents in a corpus 130 to the query 110, and return the ranked list 140 to a user. As used herein, a "document" refers to any type of object, such as a text document, an image, a video, an audio file, etc. In general, documents themselves do not need to be stored directly in an information retrieval system, and the documents may instead be represented in the system by, e.g., surrogates or metadata.

For example, the information retrieval application 120 may be a web search engine that receives a user query over the Internet, generates a ranked list of web pages (or other relevant information on the Internet such as images, videos, etc.), and returns a portion of the list containing the highest ranked web pages (or other relevant information) as a web page that can be loaded by a web browser and displayed via a display device. Other example applications of information retrieval systems include recommender systems, desktop search, enterprise search, information filtering, news search, federated search, etc.

Figure 2:
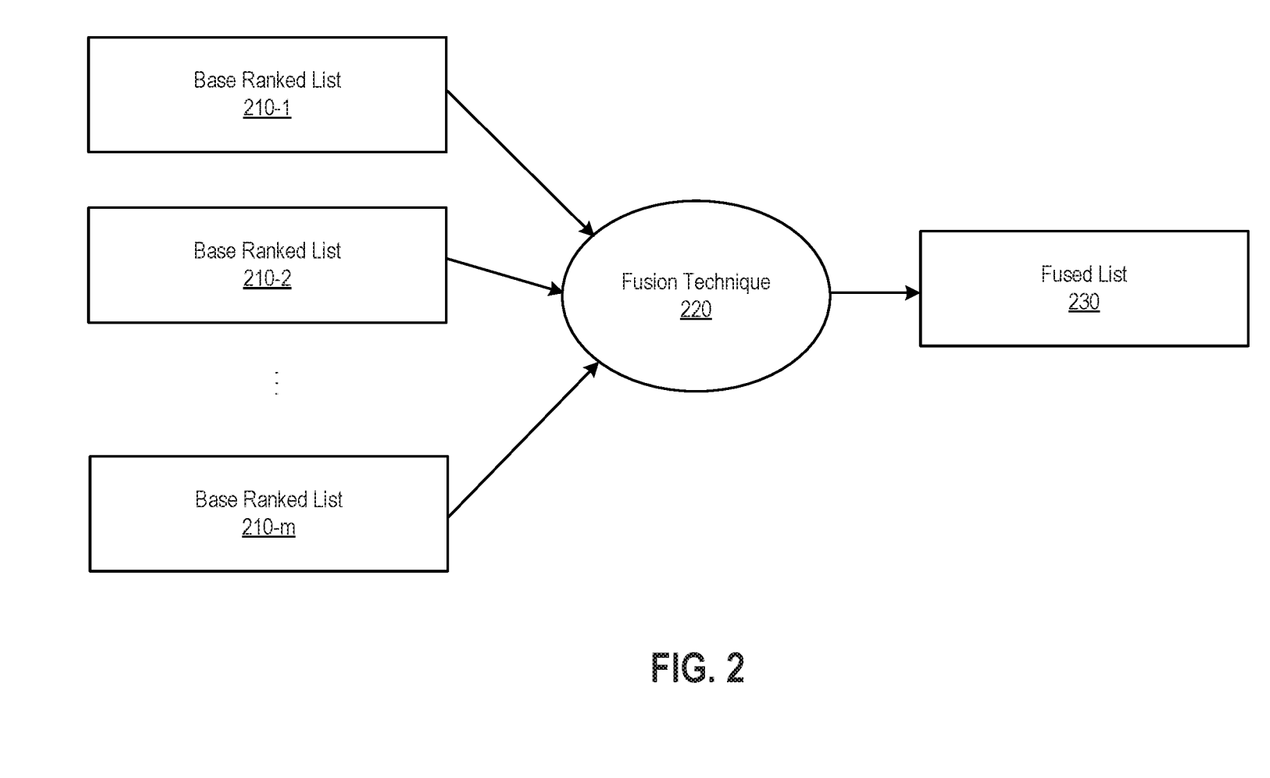
FIG. 2 illustrates an example of fusion-based retrieval, according to an embodiment.

In the fusion-based retrieval setting, instead of obtaining only a single ranked list, the quality of information retrieval results is improved by combining the ranked list outputs obtained using multiple retrieval techniques. FIG. 2 illustrates an example of fusion-based retrieval, according to an embodiment. As shown, the information retrieval application 120 applies different information retrieval techniques to generate a number of initial ranked lists 210-1 to 210-$m$ and further uses a fusion technique 220 to combine the initial ranked lists 210-1 to 210-$m$ into a single fused list 230, which is returned as the final ranked list. Any technically feasible information retrieval techniques, including well-known techniques, may be used to generate the initial ranked lists 210-1 to 210-$m$, which are also referred to herein as "base" or "reference" lists. Examples of the fusion technique 220 that may be used to combine the initial ranked lists 210-1 to 210-$m$ include CombSUM, CombMNZ, rank fusion (RRF), and Borda, which are discussed in greater detail below.

More formally, let q denote a query and C denote a corpus of documents. In a fusion-based retrieval setting, query q is evaluated over corpus C using several different retrieval techniques. Let $\mathcal{L} = \{L_1, L_2, \ldots, L_m\}$ denote a set of m(>1) ranked lists, where each ranked list $L_i (\in \mathcal{L})$ contains the top-k documents $d (\in C)$ with the highest retrieval scores $S_{L_i}(d|q)$ according to the i-th retrieval technique (i $\in$ {1, 2, ..., m}), A fusion technique F takes the ranked lists $\mathcal{L}$ as input and returns an aggregated (top-k) ranked list, also referred to herein as the fused list and denoted $L_F$.

Figure 3:
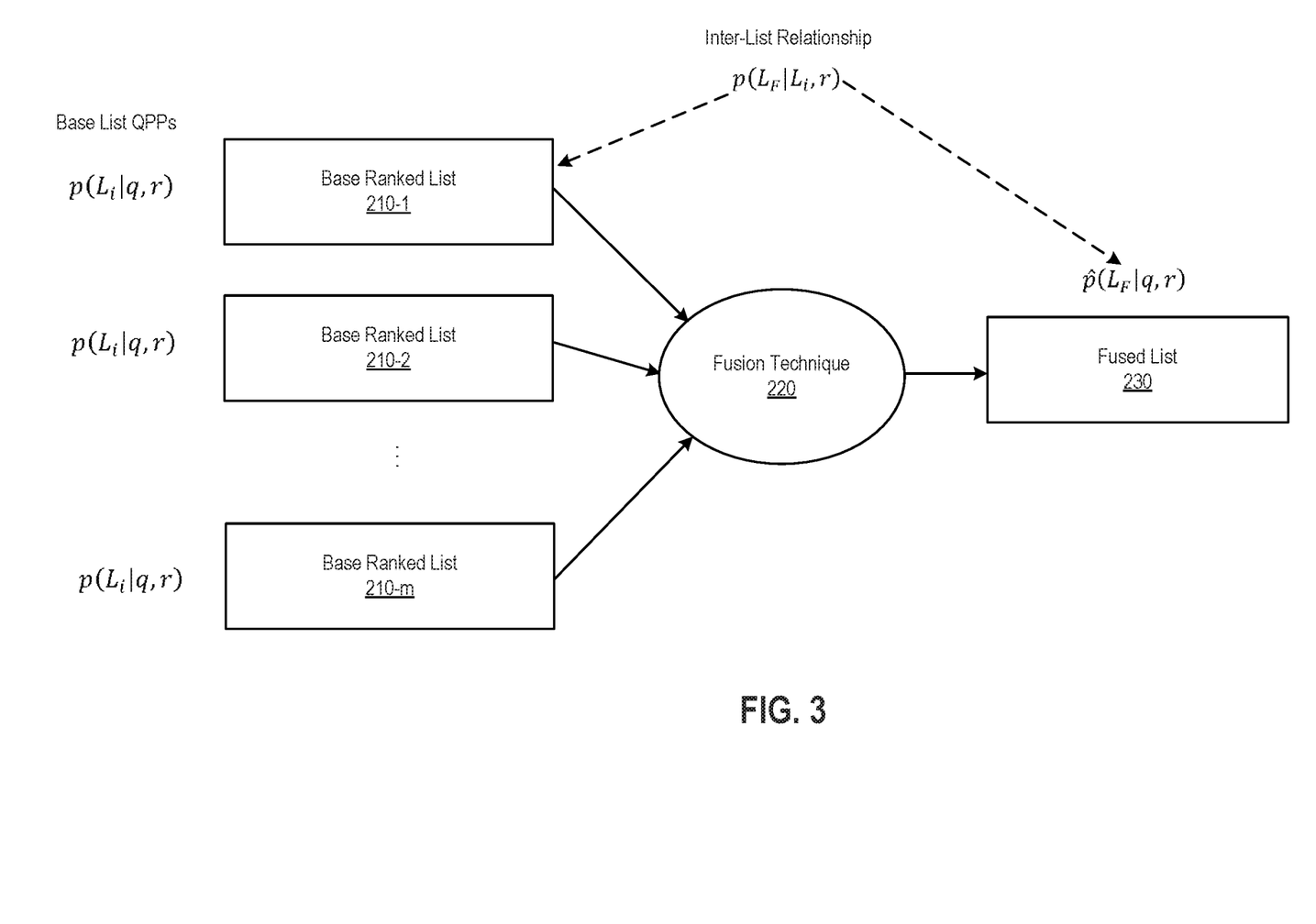
FIG. 3 illustrates an example of query performance prediction using asymmetric list co-relevance in the fusion-based retrieval setting, according to an embodiment.

FIG. 3 illustrates query performance prediction using asymmetric list co-relevance in the fusion-based retrieval setting, according to an embodiment. As described, QPP techniques are useful for assessing information retrieval performance in the absence of relevance judgments. Illustratively, the goal of QPP in the fusion-based retrieval setting is to estimate $p(L_F|q, r)$, which is the (post-retrieval) likelihood that the fused list 230, denoted $L_F$ and generated by fusing the reference lists 210-1 to 210-$m$ as described above with respect to FIG. 2, includes information that is relevant to the query q. Such a likelihood $p(L_F|q, r)$ may be estimated directly, based on the self-properties of the fused list $L_F$, or alternatively based on the reference lists 210-1 to 210-$m$, in which case the ranked lists in the set $\mathcal{L}$, described above, are treated as the reference lists 210-1 to 210-$m$ and $p(L_F|q, r)$ is estimated as follows:

$$\hat{p}(L_F|q, r) \stackrel{\text{def}}{=} \Sigma_{L_i \in \mathcal{L}} p(L_F|L_i, r) p(L_i|q, r). \quad (1)$$

Here, every base (ranked) list $L_i \in \mathcal{L}$ in equation (1) may be assumed to be a pseudo-effective reference list, the term $p(L_i|q, r)$ entails a generic prediction approach based on each base ranked list $L_i$'s own performance prediction, and the term $p(L_F|L_i, r)$ captures a relationship between the (presumably) effective base ranked list $L_i$ and the fused list $L_F$.

Traditionally, the $p(L_F|L_i, r)$ term in equation (1) was estimated according to the symmetric similarity $\text{sim}(L_i, L_F)$ between the base and fused ranked lists $L_i$ and $L_F$, and list similarity was further estimated based on either document identities (e.g., overlap), their (retrieval) scores (e.g., correlation) or relative ranks within both ranked lists. By contrast, embodiments disclosed herein rely on the fact that $p(L_F|L_i, r)$ actually "encodes" an asymmetric co-relevance relationship between the base and fused ranked lists $L_i$ and $L_F$. Such a relationship captures the fact that a given "relevant" reference list $L_i$ serves as an informative evidence source of a given observed fused list $L_F$. Traditional reference-list based QPP techniques, which model the relationship solely according to $\text{sim}(L_i, L_F)$, do not properly account for such a "cause and effect" based relationship between the reference $L_i$ and fused $L_F$ lists. That is, the asymmetric co-relevance relationship between the base and fused ranked lists $L_i$ and $L_F$ accounts for the order in which these lists are generated and attempts to determine, given that a base ranked list $L_i$ is effective (i.e., assuming that that the base ranked list $L_i$ has some relevant information), what the likelihood is of observing the fused list $L_F$.

The following is a derivation of an estimator for the asymmetric co-relevance likelihood $p(L_F|L_i, r)$, according to an embodiment. Using a Bayesian interpretation of the likelihood $p(L_F|L_i, r)$ gives:

$$p(L_F | L_i, r) \stackrel{\text{def}}{=} \frac{p(r|L_F, L_i) p(L_f|L_i)}{p(r|L_i)}. \quad (2)$$

Here, the term $p(L_f|L_i)$ captures the relevance-independent part of the relationship between the base and fused ranked lists $L_i$ and $L_F$, which corresponds to the list similarity $\text{sim}(L_i, L_F)$ estimate in traditional reference-list based QPP techniques. Using this fact, the following "adjusted" similarity-based estimator may be derived:

$$\hat{p}(L_F|L_i, r) \stackrel{\text{def}}{=} O_r(L_F, L_i) \text{sim}(L_i, L_F), \quad (3)$$

where:

$$O_r(L_f, L_i) \stackrel{\text{def}}{=} \frac{p(r|L_F, L_i)}{p(r|L_i)}. \quad (4)$$

$O_r(L_F, L_i)$ adjusts $\text{sim}(L_i, L_F)$ according to the odds-ratio between the symmetric (joint) co-relevance of both ranked lists to list $L_i$'s own relevance, i.e., the odds of containing relevant information given that both the base ranked list $L_i$ and the fused list $L_F$ are observed, divided by the odds of containing relevant information given that only the base ranked list $L_i$ is observed. Intuitively, the higher the odds are, the more informative the base ranked list $L_i(\in \mathcal{L})$ is assumed to be with respect to the determination of the relevancy of the fused list $L_F$. As a result, higher odds are assumed to imply that higher quality should be predicted for fused list $L_F$ based on its similarity with base ranked list $L_i$. That is, the lower the denominator and higher the numerator in equation (4), the more the base ranked list is informative in its relationship to the fused list in terms of explaining that the fused list will include relevant information. Conversely, if the odds are low (the denominator is higher relative to the numerator), then the base ranked list is not informative enough to explain that the fused list is relevant. Intuitively, if the starting point is a base ranked list that is not able to explain whether a given document is relevant or not, then the final fused list cannot rely on such a base ranked list as a source of relevant information.

The term $p(r|L_F, L_i)$ in equation (4) captures the symmetric co-relevance relationship between the base ranked and fused lists $L_i$ and $L_F$. This term may be estimated given the documents in $L_F$ as:

$$\hat{p}(r|L_F, L_i) \stackrel{\text{def}}{=} \Sigma_{d \in L_F} p(r|d, L_i) p(d|L_F) \quad (5)$$

Then, after noting that $$p(r|d, L_i) \stackrel{def}{=} \frac{p(d, r|L_i)}{p(d|L_i)}$$

and modifying equation (5) accordingly, the result of such a modification can be inserted back into equation (4), giving the following derivation of $O_r(L_F, L_i)$:

$$O_r(L_F, L_i) \stackrel{def}{=} \sum_{d \in L_F} p(d|L_F) \left( \frac{p(d, r|L_i)}{p(d|L_i)p(r|L_i)} \right). \quad (6)$$

Equation (6) reveals that $O_r(L_F, L_i)$ basically adjusts the similarity $sim(L_i, L_F)$ with respect to each observed document $d \in L_F$, where the likelihood ratio $$\frac{p(d, r|L_i)}{p(d|L_i)p(r|L_i)}$$

in equation (6) weights each document $d \in L_F$ based on whether or not the reference list $L_i$ should "attest" for d's relevancy. On the one extreme, $p(d, r|L_i) \ll p(d|L_i)p(r|L_i)$, which may imply that there is a low confidence that list $L_i$ should serve as the "evidence" source for document d's relevancy. As a result, in such a case, the relevant contribution of $sim(L_i, L_F)$ should be attenuated to the performance prediction of $L_F$. On the other extreme, $p(d, r|L_i) \gg p(d|L_i)p(r|L_i)$, which would (marginally) boost $sim(L_i, L_F)$ and imply that list $L_i$ is informative and, therefore, should be used to predict the performance of $L_F$.

For any given list $L(\in \mathcal{L} \cup \{L_F\})$, the term $p(d|L)$ in equation (6) captures the (general) relationship between a given document d and list L. In one embodiment, $p(d|L)$ in equation (6) is estimated as the Bhattacharyya similarity between unsmoothed language models: $\hat{p}(d|L) \doteq \Sigma_w \sqrt{\hat{p}(w|\theta_d)\hat{p}(w|\theta_L)}$. A language model gives the likelihood of observing a word in a text. The words in a text, such as a concatenation of all documents in a list to obtain a metadocument representing the list, can be counted in order to obtain a language model (which is a count of words divided by the total number of words), such as a language model of the list. Although described herein primarily with respect to Bhattacharyya similarity, other measures of similarity may be used in alternative embodiments, such as Cosine similarity or other similarity measures from the f-divergence similarity family to which Bhattacharyya similarity belongs.

Next, for any given list $L(\in \mathcal{L})$, the term $p(r|L)$ in equation (6) measures a likelihood that list L contains any relevant information and may be estimated as the entropy of its unsmoothed language model: $\hat{p}(r|L) \doteq -\Sigma_w \hat{p}(w|\theta_L) \log \hat{p}(w|\theta_L)$. That is, the information retrieval application 120 may go over the lexicon of the unsmoothed language model (including possible words) and measure entropy using such a formula.

Finally, the term $p(d, r|L_i)$ in equation (6) measures a likelihood that a relevant document is observed in list $L_i$. Note that $p(d, r|L_i) \propto p(L_i, r|d)$, meaning the term $p(d, r|L_i)$ may be estimated as the information gained by generating the relevance model induced from list L (denoted $\theta_{R_{[L_i]}}$) from document d's ($\in L_F$) unsmoothed language model to generating the term from the background (corpus) model, i.e., $$\hat{p}(L_i, r|d) \stackrel{def}{=} \sum_w \hat{p}(w|\theta_{R_{[L_i]}})[\log \hat{p}(w|\theta_d) - \log \hat{p}(w|\theta_C)]. \quad (7)$$

A relevance model is a language model that gives higher probability to words that are more relevant to a query, i.e., the relevance model not only counts words but gives a bias to words that are more relevant to the query. A list may be assumed to contain relevant information and be represented by its relevance model, and the question is then whether the relevance model for the list can be encoded using a document's own language model. Assuming that the entire corpus of documents is a background language model, the information retrieval application 120 may create a metadocument by concatenating all of the documents in the corpus. The information gained by generating the relevance model induced from list L from document d's unsmoothed language model to generating the term from the background (corpus) model is then a difference between entropies (in equation (7)), one entropy given the document model and the other entropy given the background corpus model. A document is able to generate a relevant list if its own language model is more capable of explaining the relevance model than the background corpus model.

Figure 4:
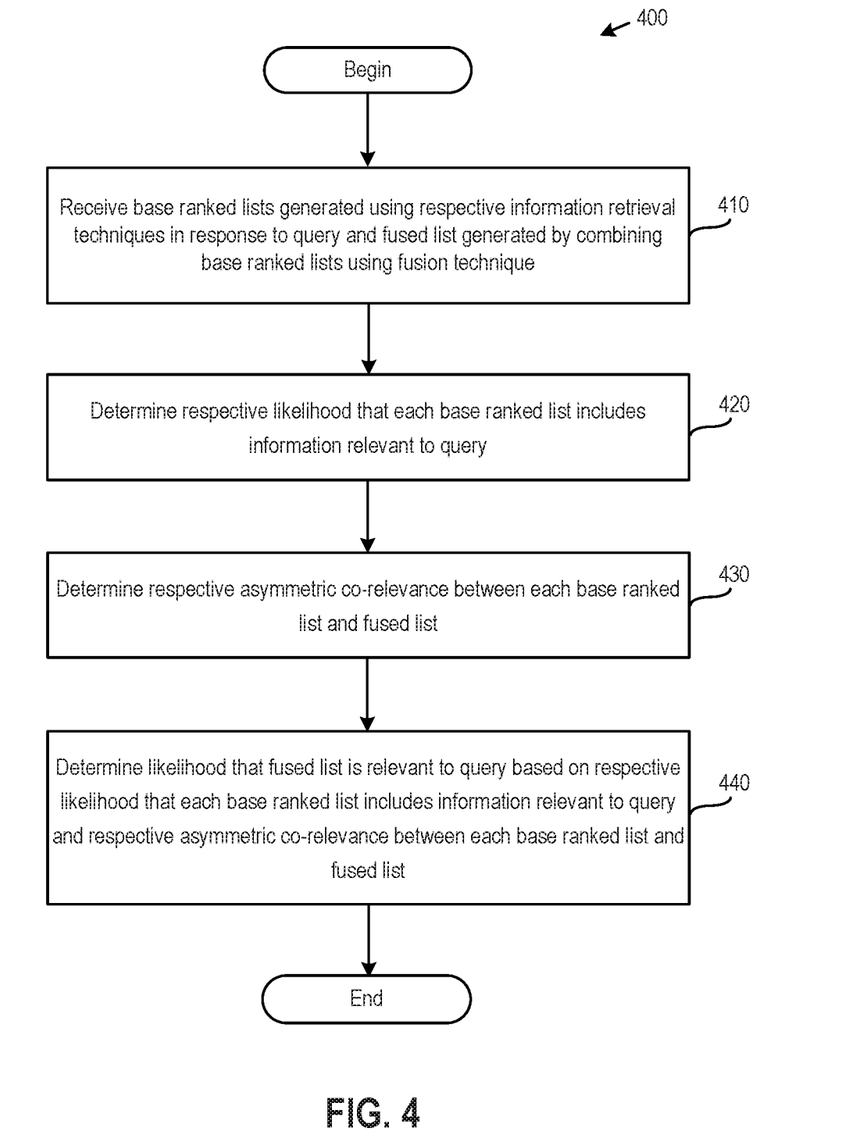
FIG. 4 illustrates a method for predicting query performance fusion-based retrieval using asymmetric list co-relevance, according to an embodiment.

FIG. 4 illustrates a method 400 for predicting query performance in fusion-based retrieval using asymmetric list co-relevance, according to an embodiment. As shown, the method 400 begins at step 410, where the information retrieval application 120 receives base ranked lists that are generated using respective information retrieval techniques in response to a query and a fused list that is generated by combining the base ranked lists using a fusion technique. In one embodiment, the fusion technique may score documents $d \in \cup_{i=1}^m L_i$ and return a number of documents (e.g., 100 documents) with the highest fusion scores. As described, examples of such fusion techniques include the CombSum, CombMNZ, Borda, and RFF techniques. As a preliminary step in fusing base ranked lists, the document scores of each list $L_i \in \mathcal{L}$ may be sum-normalized. Let $\overline{S}_{L_i}(d|q)$ denote the normalized score of document $d \in L_i$ (whenever $d \notin L_i$, then $\overline{S}_{L_i}(d|q)=0$. The CombSUM score of a given document may then be calculated as $S_{CombSUM}(d|q, \mathcal{L}) \doteq \Sigma_i^m \overline{S}_{L_i}(d|q)$. The CombMNZ score of a document may be calculated as $S_{CombMNZ}(d|q, \mathcal{L}) \doteq NZ(d|\mathcal{L}) \cdot S_{CombSUM}(d|q, \mathcal{L})$, where $NZ(d|\mathcal{L})$ is the number of lists in $\mathcal{L}$ that contain document d. For the Borda and RFF techniques, let $rank_{L_i}(d)$ denote the rank of document $d \in L_i$. Then, the Borda score of a given document is defined as the number of documents not ranked higher than in the lists, i.e., $S_{Borda}(d|q, \mathcal{L}) \doteq \Sigma_i^m \#\{d' \in L_i; rank_{L_i}(d') > rank_{L_i}(d)\}$. The RFF score of a given document may be calculated according to its reciprocal ranks as follows:

$$S_{RRF}(d|q, \mathcal{L}) \stackrel{def}{=} \sum_i^m \frac{1}{rank_{L_i}(d) + v}.$$

At step 420, the information retrieval application 120 determines a respective likelihood that each base ranked list includes information relevant to the query. That is, the $p(L_i|q, r)$ term in equation (1) is determined. Any technically feasible QPP technique such as the Clarity or weighted information gain (WIG) techniques, may be used to predict the query performance of a base ranked list. The Clarity technique estimates query performance according to the divergence between the relevance model induced from a given ranked list and the background model induced from the corpus of documents. The WIG technique estimates query performance according to the difference between the average retrieval score of documents in a given ranked list and that of the corpus of documents. Other QPP techniques may also be used to predict the query performance of the base ranked list, such as the Normalized Query Commitment (NQC) or Query-Feedback (QF) techniques.

At step 430, the information retrieval application 120 determines a respective asymmetric co-relevance between each base ranked list and the fused list. That is, the $p(L_F|L_i, r)$ term in equation (1) is determined. In one embodiment, the respective asymmetric co-relevance between each base ranked list and the fused list is determined by adjusting a symmetric co-relevance of the base ranked list and the fused list using an odds ratio between the symmetric co-relevance of the base ranked list and the fused list to the base ranked list's own relevance, according to equation (3) in which the respective asymmetric co-relevance is $\hat{p}(L_F|L_i, r) \stackrel{\text{def}}{=} O_r(L_F, L_i) \text{sim}(L_i, L_F)$. The symmetric co-relevance of the base ranked list and the fused list may be determined using any feasible technique, such as by simply measuring the documents that the base ranked list and the fused list include or using a statistical measure that examines the difference between lengths of documents. In one embodiment, the symmetric co-relevance of the base ranked list and the fused list may be determined using the Rank-Biased Overlap (RBO) measure. The information retrieval application 120 may determine the odds ratio used to adjust the symmetric co-relevance according to equation (6) as $$O_r(L_F, L_i) \stackrel{\text{def}}{=} \sum_{d \in L_F} p(d|L_F) \left( \frac{p(d, r|L_i)}{p(d|L_i)p(r|L_i)} \right).$$

with p(d|L)
measuring a relationship between document d and list L and being estimated as, e.g., a Bhattacharyya similarity between unsmoothed language models $\hat{p}(d|L) \stackrel{\text{def}}{=} \sum_w \sqrt{\hat{p}(w|\theta_d)\hat{p}(w|\theta_L)}$ or any other suitable similarity; p(r|L) measuring a likelihood that list L contains any relevant information and being estimated as, e.g., an entropy of its unsmoothed language model $\hat{p}(r|L) \stackrel{\text{def}}{=} -\sum_w \hat{p}(w|\theta_L) \log \hat{p}(w|\theta_L)$; and $p(d, r|L_i)$ measuring a likelihood that a relevant document is observed in list $L_i$ and being estimated as, e.g., information gained by generating a relevance model induced from list L, denoted as $$\theta_{R_{[L_i]}},$$

from document d's unsmoothed language model to generating the relevance model from a background corpus model $$\hat{p}(L_i, r|d) \stackrel{\text{def}}{=} \sum_w \hat{p}(w|\theta_{R_{[L_i]}})[\log \hat{p}(w|\theta_d) - \log \hat{p}(w|\theta_C)].$$

At step 440, the information retrieval application 120 determines a likelihood that the fused list is relevant to the query based on the respective likelihood that each base ranked list includes information relevant to the query determined at step 420 and the respective asymmetric co-relevance between each base ranked list and the fused list determined at step 430. The likelihood that the fused list is relevant to the query may be estimated according to equation (1) as $\hat{p}(L_F|q, r) \stackrel{\text{def}}{=} \sum_{L_i \in L} \hat{p}(L_F|L_i, r)p(L_i|q, r)$, with the $p(L_i|q, r)$ and $p(L_F|L_i, r)$ terms having been determined at steps 420 and 430, respectively. The likelihood that the fused list is relevant to the query determined may then be returned directly to a user (e.g., by causing the likelihood value to be displayed via a display device), or the likelihood may be used by the information retrieval application 120 itself or another application, such as in the selection of a subset of base ranked lists and/or a fusion technique, as discussed in greater detail below with respect to FIG. 5.

Figure 5:
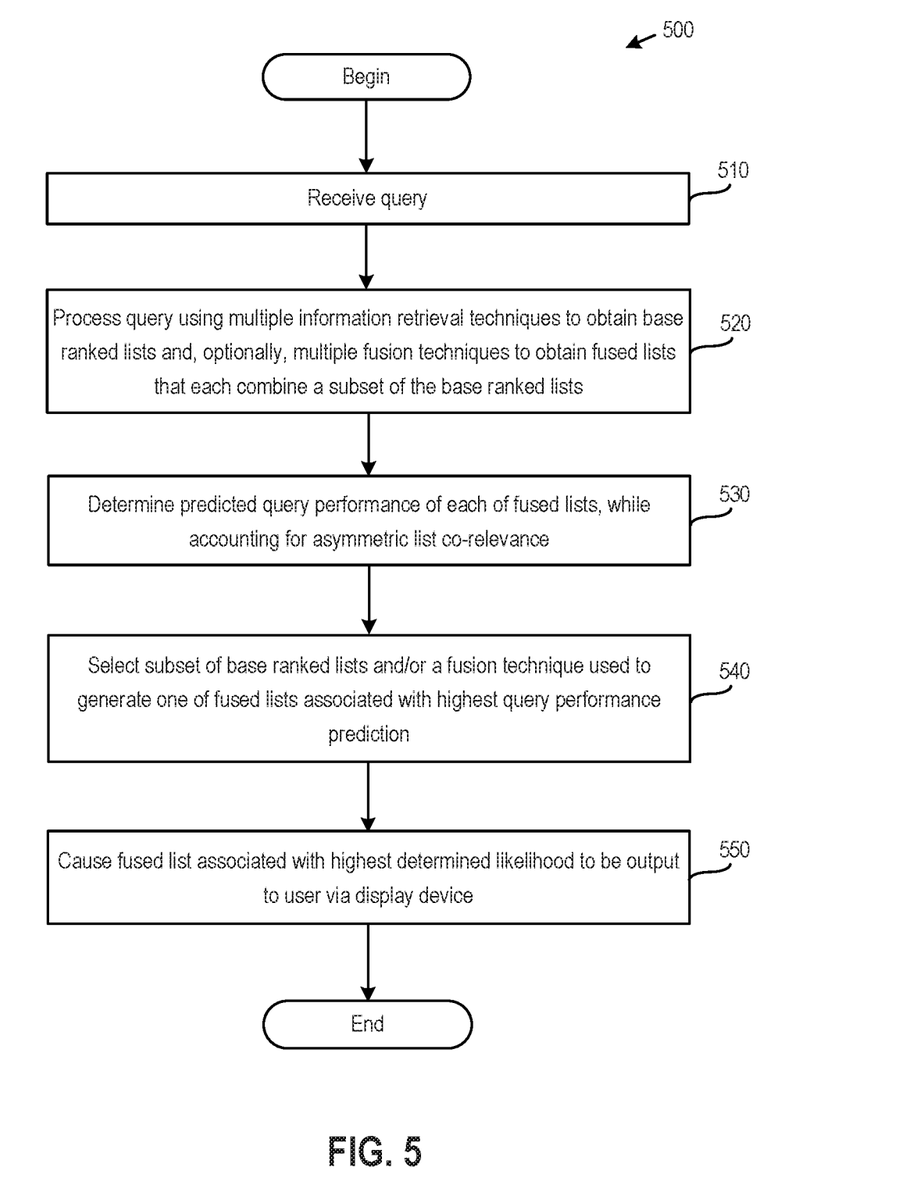
FIG. 5 illustrates a method for processing a query using a fusion-based query performance prediction technique that accounts for asymmetric list co-relevance, according to an embodiment.

FIG. 5 illustrates a method 500 for processing a query using a fusion-based query performance prediction technique that accounts for asymmetric list co-relevance, according to an embodiment. As shown, the method 500 begins at step 510, where the information retrieval application 120 receives a query. The query may be in any suitable form, such as a text string that the information retrieval application 120 receives over a network (e.g., the Internet).

At step 520, the information retrieval application 120 processes the received query using multiple information retrieval techniques to obtain base ranked lists and, optionally, multiple fusion techniques to obtain fused lists that each combine a subset of (which may include all of) the base ranked lists. Once again, any technically feasible information retrieval and fusion (e.g., CombSum, CombMNZ, Borda, RFF, etc.) techniques may be used by the information retrieval application 120 to process the received query.

At step 530, the information retrieval application 120 determines a predicted query performance of each of the fused lists obtained at step 520, while accounting for asymmetric list co-relevance. In one embodiment, the information retrieval application 120 may perform the method 400, described above with respect to FIG. 4, to predict the query performance of each of the fused lists given the base ranked lists combined to generate those fused lists.

At step 540, the information retrieval application 120 selects a subset of base ranked lists and/or a fusion technique used to generate one of the fused lists that is associated with a highest query performance prediction. That is, the information retrieval application 120 optimizes which base ranked lists are combined and/or which fusion technique is used to generate the final fused list that is returned in order to maximize the predicted query performance. If the fusion technique is fixed, then each subset of base ranked lists that is chosen will produce a different fused list, and the information retrieval application 120 may use QPP techniques disclosed herein to select a subset of base ranked lists that gives a highest predicted quality. Alternatively, the fusion technique may be changed while not changing the base ranked lists being combined. For each different fusion technique (e.g., CombMNZ, CombSUM, RRF, etc.), the information retrieval application 120 may again use QPP techniques disclosed herein to select the fusion technique that gives a highest predicted quality. In yet another embodiment, a hybrid option may be used where both the subset of base ranked lists and the fusion technique are changed, and information retrieval application 120 uses QPP techniques disclosed herein to select the best (subset of base ranked lists and fusion technique) configuration.

At step 550, the information retrieval application 120 causes the fused list that is associated with the highest determined likelihood to be output to a user via a display device. Continuing the example in which the information retrieval application 120 is a web search engine that processes a search query received over the Internet by generating fused lists and predicts query performances of those fused lists, the information retrieval application 120 may serve a web page including a portion of the fused list (e.g., including a given number of highest ranked documents in the fused list) to a user's computing device, thereby causing the web page including the fused list to be loaded by a web browser and displayed to the user via a display device.

Figure 6:
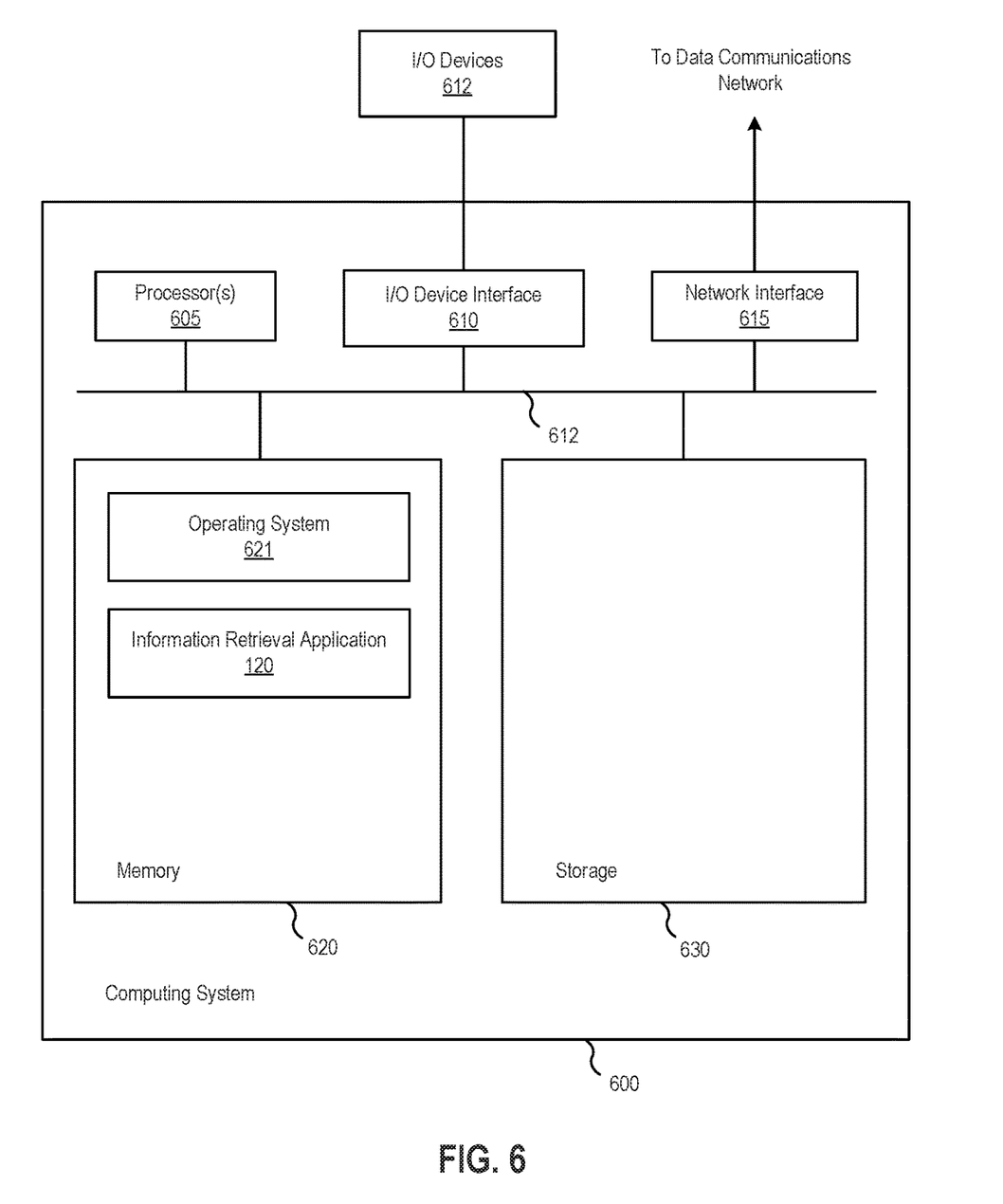
FIG. 6 illustrates a system in which an embodiment may be implemented.

FIG. 6 illustrates a system 600 in which an aspect of this disclosure may be implemented. As shown, the system 600 includes, without limitation, a central processing unit (CPU) 605, a network interface 615 connecting the system 600 to a network 616, an interconnect 617, a memory 620, and storage 630. The system 600 also includes an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. The CPU 605 is included to be representative of a single CPU, multiple CPUs, a CPU having multiple processing cores, one or more graphics processing units (GPUs), a combination of such processors, or any other processor(s). And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, the system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 620 includes an operating system 621 and the information retrieval application 120. The operating system 621 may be, e.g., Linux® or Windows®. The information retrieval application 120 is configured to process queries using a fusion-based query performance prediction technique that accounts for asymmetric list co-relevance. In one embodiment, the information retrieval application 120 may receive a query; process the received query using multiple information retrieval techniques to obtain base ranked lists and, optionally, multiple fusion techniques to obtain fused lists that each combine a subset of the base ranked lists; determine a predicted query performance of each of the fused lists, while accounting for asymmetric list co-relevance; select a subset of base ranked lists and/or a fusion technique used to generate one of the fused lists that is associated with a highest query performance prediction; and cause the fused list that is associated with the highest determined likelihood to be output to a user via a display device, according to the method 500 described above with respect to FIG. 5. In such a case, the information retrieval application 120 may also determine the predicted query performance of a fused list by receiving base ranked lists that are generated using respective information retrieval techniques in response to a query and the fused list that is generated by combining the base ranked lists using a fusion technique; determining a respective likelihood that each base ranked list includes information relevant to the query; determining a respective asymmetric co-relevance between each base ranked list and the fused list; and determining a likelihood that the fused list is relevant to the query based on the respective likelihood that each base ranked list includes information relevant to the query and the respective asymmetric co-relevance between each base ranked list and the fused list, according to the method 400 described above with respect to FIG. 4.

Although discussed above primarily with respect to fusion-based retrieval, the asymmetric list co-relevance described herein may also be adapted to model asymmetric list co-relevance relationships for query performance prediction in other retrieval settings that include reference lists and are multi-stepped in their nature. Examples of such retrieval settings include the reranking, cascade-retrieval, and diversification settings. Reranking may include generating a base ranked list and reranking the documents therein (as opposed to fusing the base ranked list with other base ranked lists) to generate a final ranked list. Cascade retrieval may include using ranking functions to progressively prune documents and refine the rank order of non-pruned documents. Diversification may include generating a base ranked list and modifying the base ranked list by pushing to the top of the list not only documents containing relevant information but also documents that are different from each other.

Advantageously, techniques are disclosed herein for query performance prediction that account for asymmetric co-relevance relationships between ranked lists. Experience has shown that, in the fusion-based retrieval setting, the QPP techniques disclosed herein are more accurate and consistent (less sensitive to the fusion technique used to generated a fused list) than traditional QPP techniques that assume symmetric list co-relevance. Further, the QPP techniques disclosed herein may be used in the fusion-based retrieval setting to select a subset of reference lists to fuse from a set of reference lists and/or to select a fusion technique to use from multiple available fusion techniques. As a result, a fused list that is associated with a highest QPP score for a given query may be generated and a portion thereof output to a user via a display device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the foregoing features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the information retrieval application 120) or related data available in the cloud. For example, the information retrieval application 120 could execute on a computing system in the cloud. In such a case, the information retrieval application 120 could process queries using a fusion based query performance prediction technique that accounts for asymmetric list co-relevance and store the results at a storage location in the cloud, or transmit the results to a user's computing device. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for predicting query performance, the method comprising:
  receiving a plurality of base ranked lists, each generated using a respective information retrieval technique based on a query;
  receiving a first combined ranked list generated by combining at least a subset of the plurality of base ranked lists; and
  determining a likelihood that the first combined ranked list includes information relevant to the query comprising, for each respective base ranked list of the plurality of base ranked lists:
    determining a respective likelihood that the respective base ranked list includes information relevant to the query, and
    determining a respective asymmetric co-relevance between the respective base ranked list and the first combined ranked list based at least in part on an odds ratio between a symmetric co-relevance of the respective base ranked list and the first combined ranked list to the respective base ranked list's own relevance.

2. The method of claim 1, wherein the first combined ranked list is generated using a fusion technique.

3. The method of claim 2, further comprising:
  receiving a plurality of combined ranked list, each generated by combining at least a subset of the plurality of base ranked lists using a respective fusion technique;
  determining, for each respective combined ranked list of the plurality of combined ranked lists, a respective likelihood that the respective combined ranked list includes information relevant to the query;
  selecting a combined ranked list associated with a highest determined likelihood; and
  causing at least a portion of the selected combined ranked list to be output to a user via a display device.

4. The method of claim 2, wherein the respective asymmetric co-relevance between each base ranked list of the plurality of base ranked lists is determined by adjusting the symmetric co-relevance of the respective base ranked list and the first combined ranked list using the odds ratio between the symmetric co-relevance of the respective base ranked list and the first combined ranked list to the respective base ranked list's own relevance.

5. The method of claim 4, wherein:
  the odds ratio has form $$O_r(L_F, L_i) \stackrel{def}{=} \sum_{d \in L_F} p(d|L_F) \frac{p(d, r|L_i)}{p(d|L_i)p(r|L_i)};$$

$p(d|L)$ measures a relationship between document d and list L;
  $p(r|L)$ measures a likelihood that list L includes any relevant information; and
  $p(d, r|L_i)$ measures a likelihood that a relevant document is observed in list $L_i$.

6. The method of claim 5, wherein:
  $p(d|L)$ is estimated as a Bhattacharyya or Cosine similarity between unsmoothed language models $$\hat{p}(d|L) \stackrel{def}{=} \sum_w \sqrt{\hat{p}(w|\theta_d)\hat{p}(w|\theta_L)};$$

$p(r|L)$ is estimated as an entropy of unsmoothed language model $\hat{p}(r|L) \stackrel{def}{=} -\Sigma_w \hat{p}(w|\theta_L) \log \hat{p}(w|\theta_L)$; and
  $p(d, r|L_i)$ is estimated as information gained by generating a relevance model induced from list L from document d's unsmoothed language model to generating the relevance model from a background corpus model $$\hat{p}(L_i, r \mid d) \overset{def}{=} \sum_w \hat{p}(w \mid \theta_{R_{[L_i]}})[\log \hat{p}(w \mid \theta_L) - \log \hat{p}(w \mid \theta_C)].$$

7. The method of claim 2, wherein the respective likelihood that each of the plurality of base ranked lists includes information relevant to the query is determined using one of a Clarity, a weighted information gain (WIG), a Normalized Query Commitment (NQC), or a Query-Feedback (QF) technique.

8. The method of claim 2, wherein the fusion technique used to generate the first combined ranked lists is one of CombSUM, CombMNZ, reciprocal rank fusion (RRF), or Borda.

9. The method of claim 1, wherein the query is a web search query received over the Internet.

10. The method of claim 1, wherein the first combined ranked list is generated using either a reranking technique, a cascade-retrieval technique, or a diversification technique.

11. A non-transitory computer-readable storage medium storing a program, which, when executed by a processor performs operations for predicting query performance, the operations comprising:
receiving a plurality of base ranked lists, each generated using a respective information retrieval technique based on a query;
receiving a first combined ranked list generated by combining at least a subset of the plurality of base ranked lists; and
determining a likelihood that the first combined ranked list includes information relevant to the query comprising, for each respective base ranked list of the plurality of base ranked lists:
determining a respective likelihood that the respective base ranked list includes information relevant to the query, and
determining a respective asymmetric co-relevance between the respective base ranked list and the first combined ranked list based at least in part on an odds ratio between a symmetric co-relevance of the respective base ranked list and the first combined ranked list to the respective base ranked list's own relevance.

12. The computer-readable storage medium of claim 11, wherein the first combined ranked list is generated using a fusion technique.

13. The computer-readable storage medium of claim 12, the operations further comprising:
receiving a plurality of combined ranked list, each generated by combining at least a subset of the plurality of base ranked lists using a respective fusion technique;
determining, for each respective combined ranked list of the plurality of combined ranked lists, a respective likelihood that the respective combined ranked list includes information relevant to the query;
selecting a combined ranked list associated with a highest determined likelihood; and
causing at least a portion of the selected combined ranked list to be output to a user via a display device.

14. The computer-readable storage medium of claim 12, wherein the respective asymmetric co-relevance between each base ranked list of the plurality of base ranked lists is determined by adjusting the symmetric co-relevance of the respective base ranked list and the first combined ranked list using the odds ratio between the symmetric co-relevance of the respective base ranked list and the first combined ranked list to the respective base ranked list's own relevance.

15. The computer-readable storage medium of claim 14, wherein:
the odds ratio has form $$O_r(L_F, L_i) \overset{def}{=} \sum_{d \in L_F} p(d \mid L_F) \frac{p(d, r \mid L_i)}{p(d \mid L_i) p(r \mid L_i)};$$

p(d|L) measures a relationship between document d and list L;
p(r|L) measures a likelihood that list L includes any relevant information; and
$p(d, r \mid L_i)$ measures a likelihood that a relevant document is observed in list $L_i$.

16. The computer-readable storage medium of claim 15, wherein:
p(d|L) is estimated as a Bhattacharyya or Cosine similarity between unsmoothed language models $$\hat{p}(r \mid L) \overset{def}{=} -\sum_w \hat{p}(w \mid \theta_L) \log \hat{p}(w \mid \theta_L);$$

p(r|L) is estimated as an entropy of unsmoothed language model $$\hat{p}(d \mid L) \overset{def}{=} \sum_w \sqrt{\hat{p}(w \mid \theta_d) \hat{p}(w \mid \theta_L)};$$

and
$p(d, r \mid L_i)$ is estimated as information gained by generating a relevance model induced from list L from document d's unsmoothed language model to generating the relevance model from a background corpus model $$\hat{p}(L_i, r \mid d) \overset{def}{=} \sum_w \hat{p}(w \mid \theta_{R_{[L_i]}})[\log \hat{p}(w \mid \theta_L) - \log \hat{p}(w \mid \theta_C)].$$

17. The computer-readable storage medium of claim 12, wherein the respective likelihood that each of the plurality of base ranked lists includes information relevant to the query is determined using one of a Clarity, a weighted information gain (WIG), a Normalized Query Commitment (NQC), or a Query-Feedback (QF) technique.

18. The computer-readable storage medium of claim 11, wherein the query is a web search query received over the Internet.

19. The computer-readable storage medium of claim 11, wherein the first combined ranked list is generated using either a reranking technique, a cascade-retrieval technique, or a diversification technique.

20. A system, comprising:
a processor; and
a memory, wherein the memory includes a program configured to perform operations for predicting query performance, the operations comprising:
receiving a plurality of base ranked lists, each generated using a respective information retrieval technique based on a query;

receiving a first combined ranked list generated by combining at least a subset of the plurality of base ranked lists; and determining a likelihood that the first combined ranked list includes information relevant to the query comprising, for each respective base ranked list of the plurality of base ranked lists:

determining a respective likelihood that the respective base ranked list includes information relevant to the query, and determining a respective asymmetric co-relevance between the respective base ranked list and the first combined ranked list based at least in part on an odds ratio between a symmetric co-relevance of the respective base ranked list and the first combined ranked list to the respective base ranked list's own relevance.

* * * * *